United States Patent [19]

McNabb et al.

[11] Patent Number: 4,788,718
[45] Date of Patent: Nov. 29, 1988

[54] CALL DATA COLLECTION AND MODIFICATION OF RECEIVED CALL DISTRIBUTION

[75] Inventors: Sandra D. McNabb, Red Bank; Richard S. Yien, Woodbridge, both of N.J.

[73] Assignee: American Telephone and Telegraph Company, AT & T Laboratories, Murray Hill, N.J.

[21] Appl. No.: 104,724

[22] Filed: Oct. 5, 1987

[51] Int. Cl.⁴ .............................................. H04M 3/36
[52] U.S. Cl. .................................... 379/113; 379/115; 379/134
[58] Field of Search ............... 379/115, 113, 133, 134, 379/139

[56] References Cited

U.S. PATENT DOCUMENTS

| | | | |
|---|---|---|---|
| 3,749,845 | 7/1973 | Fraser | 179/15 AL |
| 3,979,733 | 9/1976 | Fraser | 340/172.5 |
| 4,191,860 | 3/1980 | Weber | 179/18 B |
| 4,475,189 | 10/1984 | Herr et al. | 370/62 |
| 4,545,043 | 10/1985 | Anderson et al. | 369/32 |
| 4,611,094 | 9/1986 | Asmuth et al. | 179/7.1 TP |
| 4,723,270 | 2/1988 | Okamoto et al. | 379/134 |
| 4,737,983 | 4/1988 | Frauenthal et al. | 379/221 |

OTHER PUBLICATIONS

*The Bell System Technical Journal,* "Software Organization and Basic Call Handling" by T. J. Cieslak, L. M. Croxall, J. B. Roberts, M. W. Saad and J. M. Scanlon, vol. 56, No. 7, Sep. 1977, pp. 1113–1138.
*The Bell System Technical Journal,* "Evolution of the Software Structure" by P. D. Carestia and F. S. Hudson, vol. 60, No. 6, Part 2, Jul.-Aug. 1981, pp. 1167–1201.
*The Bell System Technical Journal,* "No. 1/1A ESS-SPC Network Capabilities and Signaling Architecture" by L. J. Gawron, S. J. Lueders, and K. L. Moeller, vol. 61, no. 7; Part 3, Sep. 1982, pp. 1611–1636.
*The Bell System Technical Journal,* "800 Service Using SPC Network Capability" by D. Sheinbein and R. P. Weber, vol. 61, No. 7, Part 3, Sep. 1982, pp. 1737–1744.
*The Bell System Technical Journal,* "800 Service Using SPC Network Capability-Network Implementation and Administrative Functions" by C. W. Haas, D. C. Salerno, and D. Sheinbein, vol. 61, No. 7, Part 3; Sep. 1982, pp. 1745–1757.
*AT&T Technical Journal,* "ASQIC 800 Call Data Master" by M. R. Braunstein, C. L. Burton, S. D. McNabb, vol. 66, Issue 3, May–Jun. 1987, pp. 21–31.

*Primary Examiner*—Stafford D. Schreyer
*Attorney, Agent, or Firm*—Richard B. Havill

[57] ABSTRACT

An arrangement and method for compiling telecommunication traffic analysis data includes the steps of collecting call data for a plurality of calls to a single customer from a signaling circuit that commonly carries the signaling for calls to a plurality of customers. The call data is transmitted to and stored in a call data processor which processes the call data to compile a summary of traffic data for the plurality of calls to the customer. Further processing of the summary of traffic data results in a change of a parameter in the customer's call processing logic and a reduction of call blocking for subsequent calls.

9 Claims, 6 Drawing Sheets

FIG. 3

TABLE 1

| ACP FUNCTION NUMBER | CONVERSATION I.D. | DATE & TIME | AREA CODE NPA | DESTINATION TELEPHONE NUMBER | DISPOSITION | ERROR CODE | COLLECTED DIGIT |
|---|---|---|---|---|---|---|---|
| 17 | 423 | 3/20/87 9:27 | 317 | 312-146-9550 | ANSWERED | NONE | 2 |
| 21 | 1746 | 3/20/87 9:29 | 617 | 404-180-0740 | UNANSWERED | NONE | 3 |
| 05 | 627 | 3/20/87 9:33 | 305 | 213-142-4619 | UNANSWERED | NONE | 1 |
| 05 | 1123 | 3/20/87 9:34 | 317 | 312-146-9550 | ANSWERED | NONE | 1 |

FIG. 5

TABLE 2

| BRANCH LABEL | NUMBER ATTEMPTS | NUMBER UNANSWERED | BLOCKING RATIO | ALLOCATION PER CENT | |
|---|---|---|---|---|---|
| ATLANTA | 1001 | 100 | .10 | 80 | MIN BLOCK |
| CHICAGO | 89 | 29 | .33 | 5 | MAX BLOCK |
| LOS ANGELES | 283 | 33 | .12 | 15 | |
| TOTAL | 1373 | 162 | .12 | 100 | |

CALL DATA COLLECTION AND MODIFICATION OF RECEIVED CALL DISTRIBUTION

This invention relates to 800 telephone service calling and more particularly to an arrangement and a method for compiling traffic analysis data and an arrangement and a method for allocating calling loads among multiple locations for receiving calls to a single 800 service telephone number.

BACKGROUND OF THE INVENTION

At the present time, many large companies and government agencies off toll-free telephone calling service to their customers or constituents via 800 telephone service. Typically each company or agency establishes multiple diverse locations for receiving the calls. Each location has automatic call distribution equipment arranged for distributing among a group of attendants all of the calls received at that location. It is an objective of the company's or the agency's management to distribute the traffic load to reduce call blocking among the facilities being used and among the number of attendants contemporaneously working at the various locations for receiving calls. It is also an objective of the company's or the agency's management to determine the characteristics of their received calls for the purposes of business planning and resource allocation.

There are various known methods for distributing 800 telephone service calling loads among multiple locations. A U.S. Pat. No. 4,191,860, issued to R. P. Weber, describes a method for allocating calls to multiple locations on a fixed percentage basis. Another U.S. Pat. No. 4,611,094, issued to R. L. Asmuth et al describes a method enabling a company or agency to customize call processing logic for 800 telephone service calls. The call processing logic can be updated as traffic conditions change; however, the company or agency monitors the traffic into its own facilities, determines what if any changes should be made to the call processing logic, and manually makes those changes to the call processing logic. A copending patent application, Ser. No. 783,242, filed Oct. 2, 1985 U.S. Pat. No. 4,737,983 in the names of J. Frauenthal, W. L. Gerwirtz, T. G. Moore and R. P. Weber describes a method for balancing 800 telephone service calling loads based on traffic data gathered at the multiple locations for receiving calls. The traffic data includes items, such as, the speed of answer and the average time waiting in a queue. The method for balancing callings loads, as presented in the Frauenthal et al patent application, does not accommodate different strategies for specialized call handling capabilities which may exist for each location arranged to receive the calls.

In the prior art, there is no known arrangement or method for compiling traffic analysis data from call data collected from common circuitry in the network nor an arrangement or method for contemporaneously reduced total call blocking to multiple locations having specialized call answering capabilities for an 800 telephone service.

SUMMARY OF THE INVENTION

This problem is resolved by an arrangement and a method for compiling traffic analysis data and an arrangement and a method for adjusting calling loads among multiple locations for receiving calls through a telecommunications network to a single 800 telephone service number. A customized program, residing in the network and referred to hereinafter as call processing logic, is executed in response to each call to the assigned 800 telephone service number.

One arrangement and method includes the steps of collecting call data, representing a plurality of calls through a network to one customer, the call data being collected from a signaling circuit that is common to calls through the network to a plurality of customers; transmitting the call data to a call data processor to compile call attempt records; and the call data processor processing the call attempt records for compiling a traffic data summary for the plurality of calls through the network to the customer.

Alternatively the call data processor transmits the call attempt records to the customer.

Another arrangement and method includes the steps of transmitting to the call data processor the call processing logic used by the network for processing calls to the customer; and processing the traffic data summary with a parameter, included in the call processing logic, for determining a new value for the parameter in the call processing logic before processing subsequent calls to the customer. The new value of the parameter reduces call blocking for subsequently received calls.

BRIEF DESCRIPTION OF THE DRAWING

The subsequent detailed description will be better understood when read with reference to the attached drawing wherein:

FIG. 3 presents a TABLE 1 which shows rows of the customer's call data that is stored in the network;

FIG. 5 presents TABLE 2 which shows the customer's traffic analysis data which is compiled from the customer's call data that is stored in TABLE 1;

DETAILED DESCRIPTION

Figure 1:
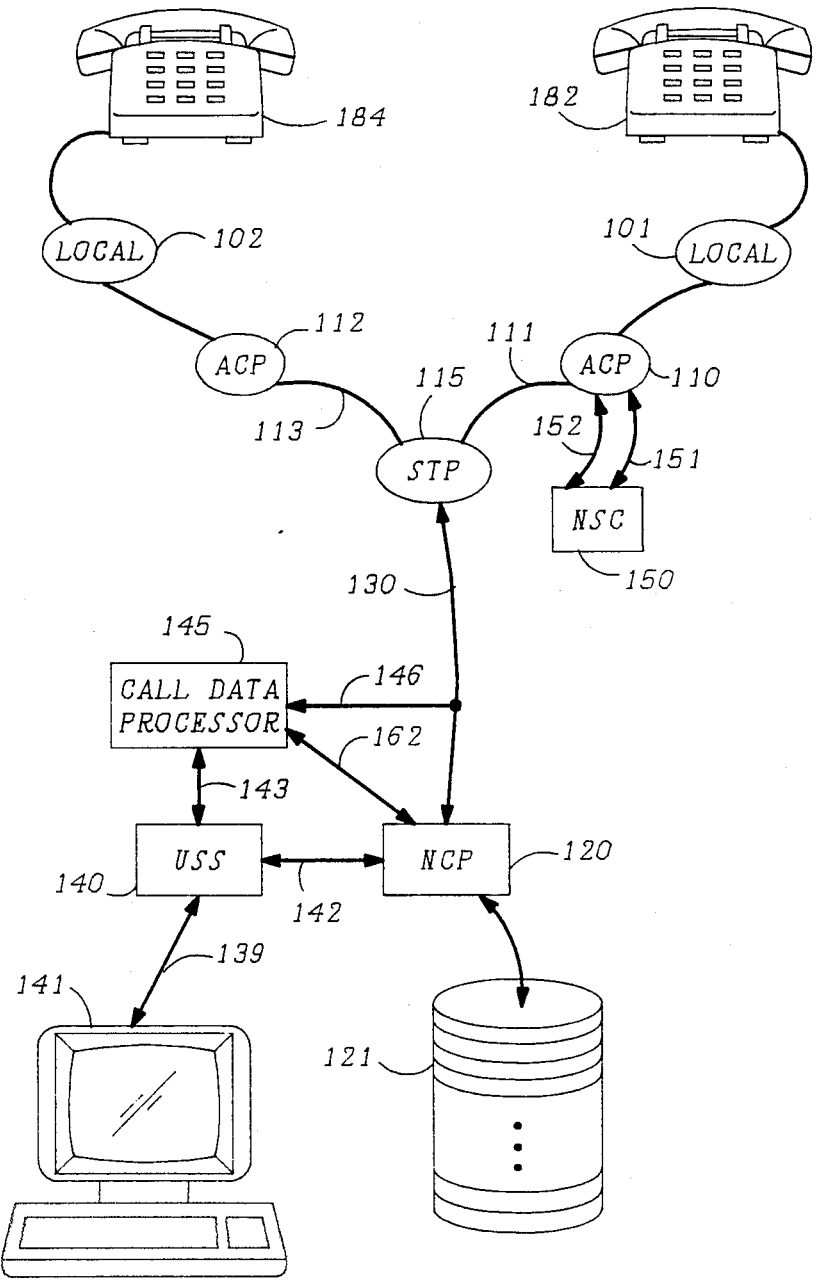
FIG. 1 is a representation of a portion of the nationwide installations of a single large 800 telephone service customer and interconnections between that customer's installations and the public telephone network.

Referring now to FIG. 1, there is shown a representation of a public telephone system including local switching offices 101 and 102; action points (ACP) 110 and 112; signaling transfer point (STP) 115 and a network control point (NCP) 120 that are used commonly to establish calls among many customers. Each ACP 110 and 112 is a switching office specially equipped to process calls in accordance with the invention. Calls so processed are called direct services dialing capability (DSDC) calls. The STP 115 also serves as the access point to a common channel signaling (CCS) network, which is a packet data switching network that interconnects the STP 115 with the NCP 120 by a common channel signaling circuit, or data link 130 that is used commonly for the calls among the many customers. A packet data switching network is disclosed in U.S. Pat. Nos. 3,749,845 and 3,979,733, issued a A. G. Fraser. An AT&T 4ESS ® switch may be used for the ACPs 110 and 112. The arrangement and operation of the 4ESS switch are described in the *Bell system Technical Journal,* Vol 56, No. 7. September 1977 and Vol. 60, No. 6, Part 2, July-August 1981.

The NCP 120 is a centralized data base facility which may include an AT&T Technologies 3B20D processor equipped with disk storage and programs to establish, edit and manage information stored in its data memory. NCP 120 also contains different customer call processing logic, or programs, for different customers. Although there may be more than one NCP in the nationwide telephone network, for simplicity, only one NCP is shown in FIG. 1. For a single 800 telephone service number, all call processing logic is stored in a single NCP.

To process DSDC calls, the ACP 110 is equipped to perform any of a plurality of primitive, independent call processing capabilities which may be linked in a desired order either on demand and on a per call basis by some intelligent process to result in a proper disposition of each call to be processed. In accordance with FIG. 1, the intelligence resides in the data base 121 of the NCP 120, as the customer's call processing logic, or program, that is executable on a per call basis.

As described in previously mentioned U.S. Pat. No. 4,611,094, a customer can update the call processing logic via a terminal 141 interacting through a line 139 with an off-line computer 140, called a user support system (USS). When the customer changes the call processing logic, an updated version of the call processing logic is sent by way of separate data links 142 and 143 to both the NCP 120 and the call data processor 145. The updated version overwrites the old version both at the NCP 120 and at the call data processor 145.

The customer's call processing logic, or program, is initially defined in a user friendly language also by interaction between the user support system (USS) 140 and the user's terminal 141. USS 140 compiles each customer's call processing logic into an interpretive object language and transmits the object language to the NCP 120 by way of the data link 142 when the customer's service is activated.

After the DSDC service is activated for the customer, the customer's call processing logic also is transmitted to and stored in the call data processor 145. Thereafter the call processing logic at the NCP 120 is executed in real time in response to each DSDC call to the customer. The customer's call processing logic at the NCP 120 makes decisions based upon certain parameters that are specified in that call processing logic. Also, the customer's call processing logic generates commands and transmits them to the ACP 110 to specify what calling capabilities are to be performed and the order of execution of the capabilities to dispose of the call, in accordance with the customer's call processing logic.

Most recent types of local and toll switching offices can be equipped to process DSDC calls. DSDC calls will be routed via local, tandem and TSPS switching offices, as required, to an appropriate 4ESS switch for access to the NCP 120 by way of the CCS 7 network. When a call is initiated, a local switch identifies a call as a toll free 800 call and routes the call to the ACP which is especially equipped to handle the specific call. That ACP serves as an access point to the common channel signaling system 7 (CCS 7) network which interconnects the ACPs 110 and 112, the STP 115 and the NCP 120 by data links 111, 113, and 130. Signal transfer point 115 is a packet switch for the CCS 7 network and is directly connected to the NCP 120 via the data link 130.

Some 4ESS switches have both CCS 7 and digital voice trunk access to an independently operable subsystem called the network services complex (NSC) 150. In FIG. 1, the ACP 110 is associated with NSC 150, which provides DSDC capabilities, such as making prompting announcements to callers and collecting information digits prompted from callers. ACP 110 communicates with NSC 150 by way of a CCS 7 data link 151 for control signaling purposes and by way of digital voice trunks 152 for making prompting announcements and for collecting prompted digits. NSC 150 is described more fully in U.S. Pat. No. 4,475,189, issued to D. E. Herr et al. Within the NSC 150, a data store used for making the prompting announcements to callers is described in U.S. Pat. No. 4,545,043, issued to T. W. Anderson et al.

Primitive, independent call processing capabilities of the ACP 110 include the capabilities to:
establish a billing record for each call,
present various announcements to callers,
prompt callers for inputting information digits and collect the resulting information digits,
route a call to a telephone number provided by the NCP 120,
perform various final call dispositions specified by the NCP 120 other than routing the call to the call destination, and
perform service assists and handoffs of a DSDC call from the ACP 110 to another ACP, such as ACP 112, which can perform a required capability not available at the ACP 110.

ACP 110 and NCP 120 communicate with each other by way of data messages transmitted through the CCS 7 network. When a DSDC call is first received at the ACP 110, it recognizes the call as a DSDC call because a special access code is prefixed to the DSDC number for identifying the customer. As a result of the identification provided by the special access code, the ACP 110 knows that it must communicate with NCP 120 to obtain instructions for processing the call.

The first DSDC message transmitted by the ACP 110 through the link 111 and the common channel signaling circuit 130 of the CCS 7 network is an initial inquiry message QRY1. The message QRY1 contains a unique number identifying the ACP 110 (ACP function number), the numbering plan area for the calling station 182, the date and time of the call, and a conversation identification number to identify the call with which the message is associated. Illustratively, the conversation identification number is the trunk number for the trunk on which the call arrived at the ACP 110.

Further messages exchanged between the NCP 120 and the ACP 110 depend upon the call processing logic supplied by the customer. In general, the additional messages will include messages such as a command from the NCP 120 for the ACP 110 to set the routing (SETR) to the desired destination, a feedback message from the ACP 110 that it is ready (RDY) to accept a new command, a command from the NCP 120 for the ACP 110 to route (RTE) the call, and feedback from the ACP 110 about the disposition of the call e.g. answered/unanswered, (TERM). If the NCP 120 needs additional information regarding the calling party, the NCP will send a message (ENV) to the ACP 110 for the ACP 110 to play an announcement to the calling party and to collect an extra digit or digits from the calling party. Thereafter the ACP 110 will transmit the collected digit, or digits to the NCP 120 by way of a message (RET). The message set for the DSDC calls is described more completely in U.S. Pat. No. 4,611,094, issued to R. L. Asmuth. After all of the information about the calling party is obtained, the NCP 120 sends the routing number and the route command RTE to the ACP 110. Once this information is received at the ACP 110, it routes the call through the network including the ACP 112 and a local switch 102 to the terminating station 184 specified by the NCP 120, as area code 312, telephone number 146-9550.

Advances in the telephony art are achieved in the arrangements and methods that include the monitoring of the common channel signaling CCS 7 messages to collect and store customer's call data, the compiling therefrom of current traffic analysis data for a customer's 800 service, the delivery of the compiled traffic analysis data to the customer in real time, and automatically updating the customer's calling logic as a result of the compiled traffic analysis data.

Figure 2:
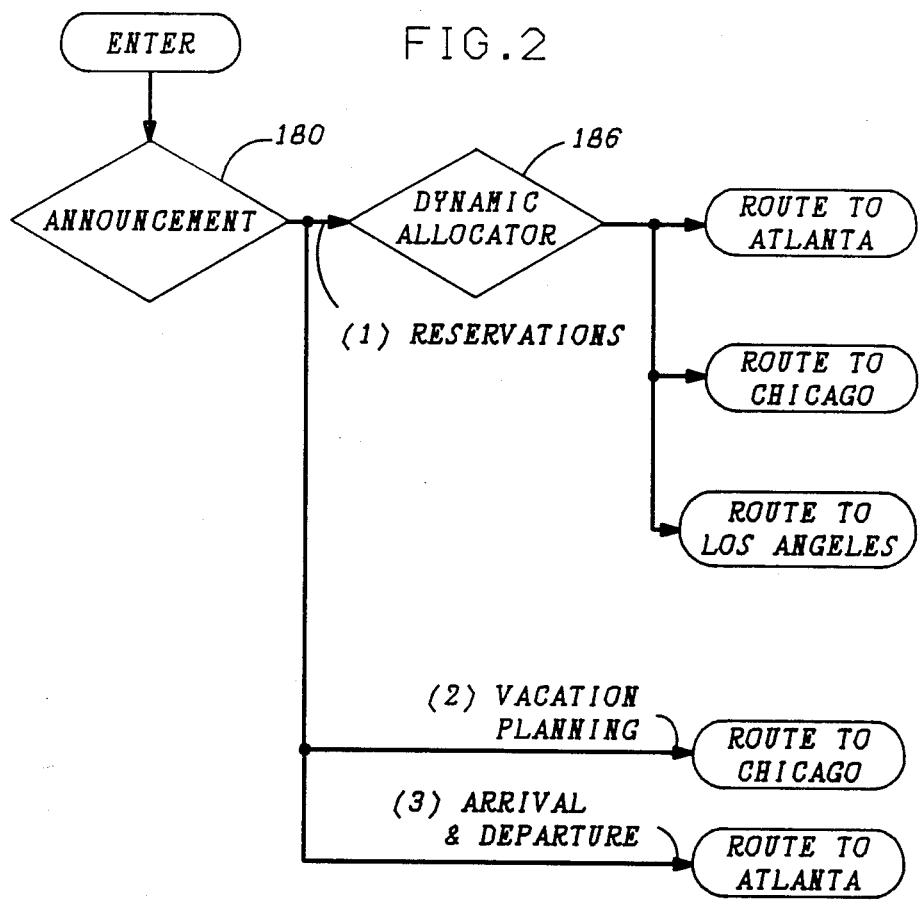
FIG. 2 is a flow chart representing the functions of the customer's call processing logic that is stored in the network.

Referring now to FIG. 2, there is shown a flow chart representing the call processing logic for an exemplary 800 service.

The customer is assumed to be a major airline which uses 800 service to answer calls for reservations, for vacation planning, and for flight arrival/departure information. There are three different location in the United States for answering the calls: Atlanta, Chicago, and Los Angeles. All three locations are capable of answering calls for reservations. Additionally, Chicago is capable of handling vacation planning inquiries, and Atlanta is capable of handling flight arrival/departure inquiries. The airline management desires to balance the reservation call load among the three locations while retaining enough available lines and staff at Chicago to serve any vacation planning calls and at Atlanta to serve any flight arrival/departure inquiries.

When the airline first established the service, it sent its call processing logic, or program, from the terminal 141 through the USS 140 to both the NCP 120 and the call data processor 145. At the NCP 120, the call processing logic is stored in the data base 121. This customer call processing logic is presented graphically by way of a flow chart in FIG. 2. Since it is data stored at the NCP 120, it can be changed readily, in accordance with methods to be explained subsequently herein.

As a part of the service that the airline management programmed into its customer calling logic, the NCP 120 commands the ACP 110 to play an announcement 180 for prompting every caller to send a supplementary digit. The ACP 110 also is commanded to collect the caller's responsive digit. In the example, the ACP 110 prompts each caller to send a digit "1" for making a reservation, to send a digit "2" for planning a vacation, and to send a digit "3" for obtaining flight arrival/departure information. Routing of the call thereafter to one of the three location will depend upon which digit the caller sends and the entirety of the customer's call processing logic.

In FIG. 1 the call data processor 145 reads, by way of a connecting data channel 146, each CCS 7 message transmitted in the common data link 130 between the NCP 120 and the ACP 110. From those messages, the call data processor 145 collects the following information relating to each call: the customer identification, the originating NPA of the calling party, the identification of any prompting announcement played by the network to the calling party, any digits entered by the calling party in response to prompting, the plain old telephone service (POTS) number of the location to which the call is routed, and the disposition of the call (answered/unanswered). From this collected information, the call data processor 145 constructs and stores a call attempt records for each call to each specific 800 customer. All of the call attempt records for a single customer are segregated from the call attempt records of other customers.

Referring now to FIG. 3, there is shown a TABLE 1 including exemplary information representing the call attempt records for four calls to the exemplary airline customer.

Assume, for example, that a caller at the station 182 (FIG. 1) in Indianapolis desires to plan a vacation and dials the 800 number for the airline. After that 800 number is forwarded from the calling station 182 through the local switch 101, the ACP 110 and the STP 115 to the NCP 120, a message ENV is returned through the common data link 130 to the ACP 110. This message ENV commands the ACP 110 to perform an announcement requesting an additional digit and to collect whatever digit is thereafter transmitted by the caller. The ACP 110 transmits the prompting announcement retrieved from the NSC 150 to the calling station 182. Then the caller sends the digit "2" to reach the vacation planning service. This digit "2" is collected by the ACP 110 and is forwarded through the STP 115 to the NCP 120 which, by reference to the airline's call processing logic, instructs the ACP 110 to route the call through the local central office 102 to the airline's Chicago location, area code 312, telephone number 146-9550. Upon ringing, the call is answered by the called station 184 at the Chicago location, and the caller proceeds to discuss a vacation plan with the airline's telephone attendant. When the calling station hangs up, the ACP 110 sends a termination (TERM) message to the NCP 120 for conveying information that tells whether or not the call attempt was answered.

Referring now to TABLE 1 in FIG. 3, a call attempt record is collected and stored at the call data processor 145 of FIG. 1 during the processing of the call. The call data processor 145 collects the call data from the messages transmitted through the common data link 130 and sorts that call data to the appropriate customer's record based upon information contained in each of the messages being transmitted between the ACP 110 and the NCP 120. The top row of FIG. 3 represents the record of the call attempt just described. The column labeled ACP FUNCTION NUMBER includes the number "17" which identifies the originating ACP 110. A CONVERSATION I.D. number "423" identifies the specific call. The DATE and TIME of the call are recorded in the third column. Since the call originated in Indianapolis, the AREA CODE NPA column stores the Indianapolis area code "317". A DESTINATION TELEPHONE NUMBER in the fifth column represents the airline's destination station POTS number in Chicago, area code 312, telephone number 146-9550. The last three columns DISPOSITION, ERROR CODE and COLLECTED DIGIT indicate that the call was answered, there were no errors, and the digit "2" was collected in response to the prompting announcement.

The second row in the TABLE of FIG. 3 represents the data collected from another call. Although the equipment for such a call is omitted from FIG. 1 for reasons of simplicity, the call represented by the second row originated from Boston, NPA 617. In response to the prompting announcement, the caller requested flight arrival/departure information by sending the digit "3". As a result the call is routed to the Atlanta location, area code 404, telephone number 180-0740. Because of a heavy volume of calls requesting flight information, all agents who handle these calls in Atlanta are busy and a busy signal is returned to the caller. The call record indicates that the call is unanswered. There was no error.

Two additional call data records are shown in the third and fourth rows. The call data stored in the third row represents a call which originated in Orlando, Fla., area code 305, and was for an airline reservation, as shown by the collected digit "1". According to the customer's calling logic of FIG. 2, the call may have been routed to either Atlanta, Chicago, or Los Angeles. For this example the call was routed to the Los Angeles, Calif. location, area code 213, telephone number 142-4619 which returned a busy tone, and the call was not answered. Data stored in the fourth row represents another call from Indianapolis, Ind., area code 317, for a reservation, as shown by the collected digit "1". This call was directed to the Chicago, Ill. location station 184 of FIG. 1, area code 312, telephone number 146-9550. The call was answered.

Figure 4:
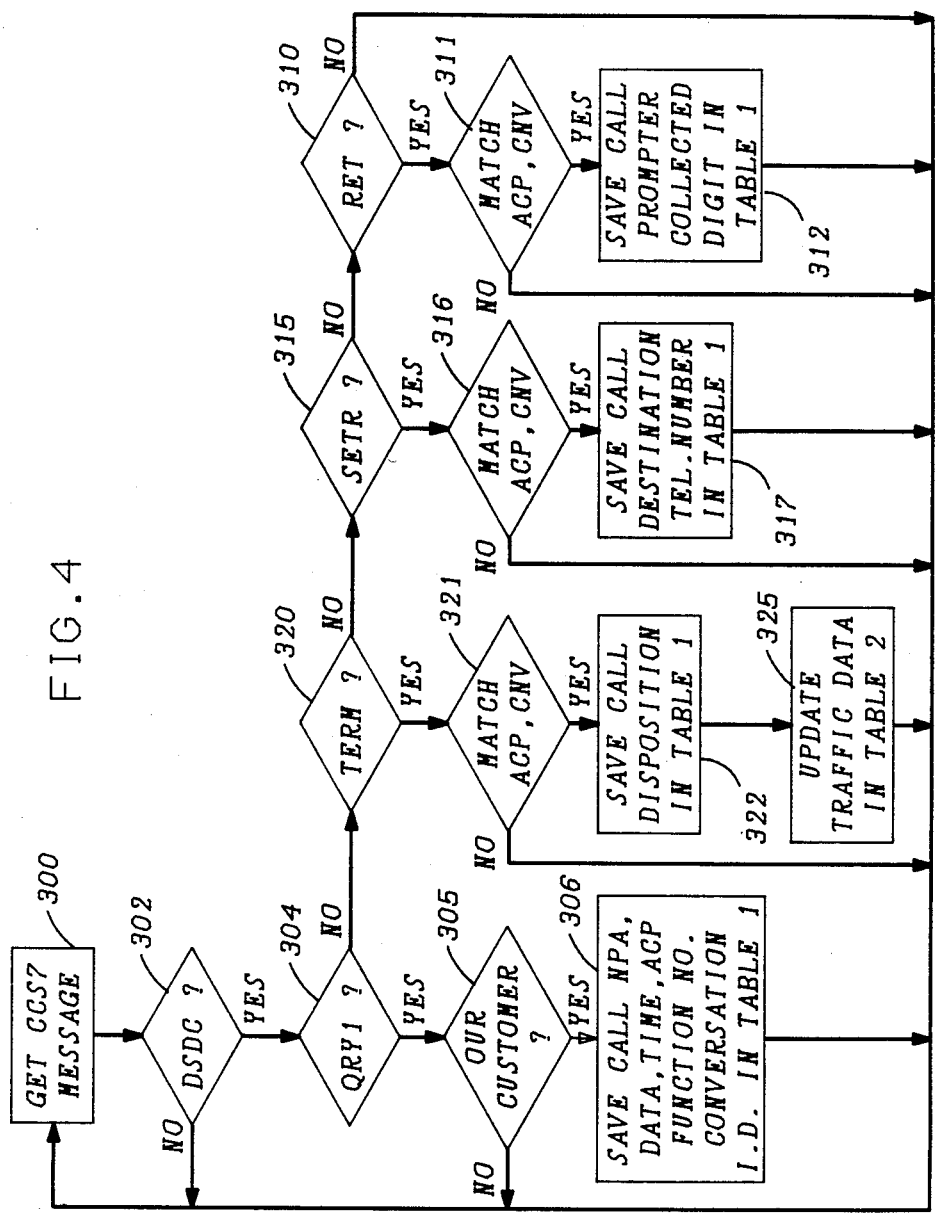
FIG. 4 presents a flow chart of the process of collecting and storing the customer's call data in TABLE 1 of FIG. 3.

FIG. 4 discloses the flow chart of the process for collecting the information for storage in TABLE 1 for a predetermined period. The period of time is subjectively selected by the customer and typically might fall in a range of 2-60 minutes. Storing the collection of each customer's call data is described subsequently with respect to FIG. 6. The call data processor 145 of FIG. 1 reads every message transmitted in the common data link 130 between the STP 115 and the NCP 120 in the network, as shown by the upper left hand block 300 of the flow chart of FIG. 4. If the message read is a DSDC message, it is decoded and its type is checked. The possible message types are QRY 1, TERM, SETR, RTE, and RET. In reference to FIGS. 1 and 4, the signaling for a single phone call is processed by reading several messages sporadically transmitted through the network, as follows. The message QRY 1 304 is recognized, decoded and checked 305 to determine that the dialed number is an 800 customer number who has purchased this feature. If it is an 800 customer, the area code NPA, the time and the date, the ACP function number, and the conversation I.D. are saved and stored 306 in TABLE 1 of the call data processor 145, which creates a new entry. A subsequent message collected by the call data processor 145 while processing this single phone call is an envelope message ENV. The envelope message is not recognized as one of the valid types of messages and is discarded. The envelope message ENV requests the ACP 110 to play the previously mentioned prompting message and to collect a digit from the caller. The next following message relating to the single phone call is the return envelope RET from the ACP 110. This message contains the collected digit. The message RET is recognized 310 by the call data processor 145. The message contains the ACP function number and the conversation I.D., which are matched against existing entries 311 in TABLE 1. When that data matches with the data stored in the row representing the existing call record for the single phone call, the collected digit resulting from the prompting announcement is stored 312 in that row of TABLE 1. The next message SETR, relating to the same single phone call, similarly is recognized 315 and is matched 316 against the corresponding entry in TABLE 1. From the message SETR, the destination telephone number is received and stored 317 in the appropriate column of the matched row of TABLE 2. The call then is routed through the ACPs and local switches and is answered at the destination station 184 of FIG. 1. When the calling party finally hangs up, a message TERM is sent back from the ACP 110 to the NCP 120. The message TERM is decoded 320 by the call data processor 145 and is matched 321 to the appropriate row in the TABLE 1 of FIG. 3. An indication of the disposition of the call, as derived from the message TERM 322, is saved in the appropriate column of the identified row in TABLE 1.

Concurrently other customer call data, received by the call data processor 145 in the sequence from signaling messages being transmitted through the common data link 130 and representing other calls to the same customer, are received and stored in their respective rows of TABLE 1.

As each of the call attempt records is completed, it is transmitted immediately from the call data processor 145 by way of line 143, USS 140, and line 139 to be displayed on the customer's terminal 141. Also concurrently customer call data for other customers are received by the call data processor 145 from the data link 130 and are stored in tables associated with those other customers and are delivered immediately to those other customers.

As shown in FIG. 2, there is a dynamic allocator 186 included in the call processing logic previously stored in the NCP 120 and in the call data processor 145. This dynamic allocator 186 is to be described in two parts. The first part of the description of the dynamic allocator 186 is a description of a TABLE 2 shown in FIG. 5. The second part of the description of the dynamic allocator is a process, or method, for analyzing traffic data, collected over a period of time, to determine whether or not the allocation percentages used by the dynamic allocator 186 are appropriate for the customer's equipment configuration and attendant force. As desired those allocation percentages are changed, or updated, either manually or automatically to different values to effectively utilize the customer's equipment and attendants.

Referring now to FIG. 5, there is shown an exemplary TABLE 2 which stores some call data accumulated and derived from calls to a single 800 number, such as the number used for calling the airline, as previously described. TABLE 2 is stored in the call data processor 145 of FIG. 1. In the TABLE 2 of FIG. 5, there is a line for storing items of data relating to each destination for airline reservation calls. Additionally, there is a bottom row for storing the totals of the customer's call data relating to reservations calls to the three destinations for airline reservation calls. Items of information stored in TABLE 2 are accumulated there during the same call sampling period for accumulating customer call data in TABLE 1.

Until an update calculation occurs at the end of the predetermined sampling period, the second from the right column stores the allocation percentage of calls to be distributed to each destination for reservation calls, i.e., collected digit "1" calls. The total of the allocation percentages is 100 percent.

There are three items of stored data relating to each call destination during the predetermined sample period. The top three rows of the left hand column merely specify the geographic destinations for purposes of identification. The first item of stored data for the top three rows is shown in the second column. That column, for each of the top three rows, represents the contents of a counter which is incremented each time a reservation call attempts to reach the destination specified in the leftmost column. The second item of stored data for the top three rows is shown in the third column for the left. That third column, for each of the top three rows, represents the contents of another counter which is incremented every time a reservation call to the specified destination is unanswered, or blocked. Similar entries in the bottom row represent the contents of counters storing the total number of call attempts to the 800 number desiring airline reservation service and the total number of those reservations calls which are not answered.

In the fourth column of TABLE 2, a blocking ratio is shown for calls made to each of the specific destinations for reservations and for the total number of reservations calls made to the 800 number during the predetermined call sampling period. These blocking ratios are determined by dividing the number of unanswered calls in the third column by the number of attempted calls in the second column for each location and for the total number of reservation calls.

Figure 6:
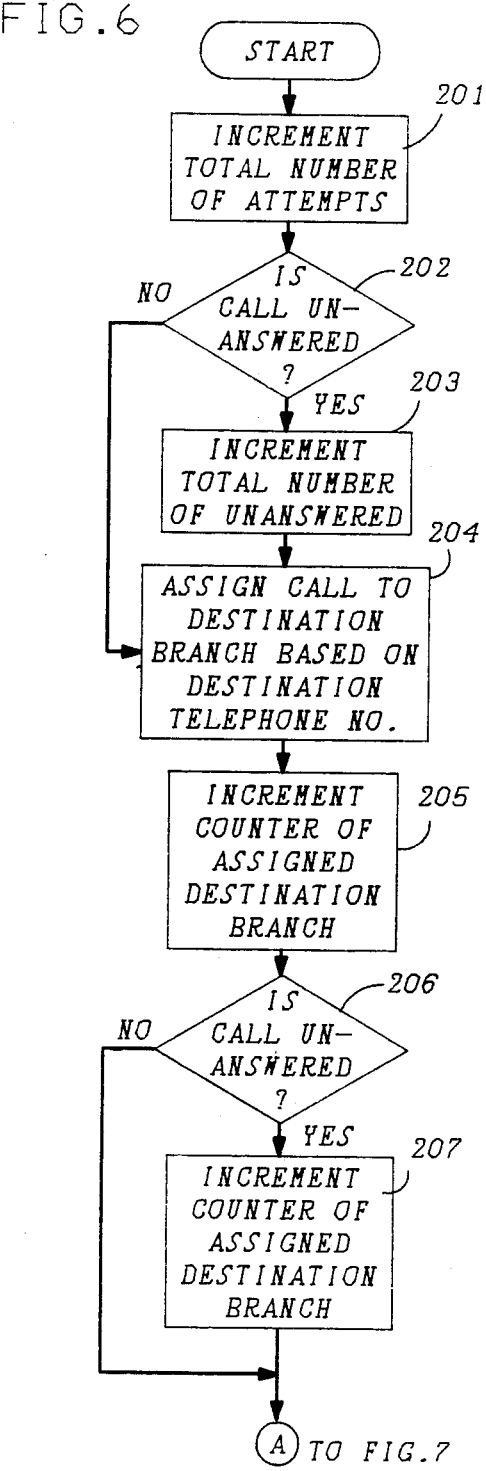
FIG. 6 is a flow chart of a method for compiling the customer's traffic analysis data in TABLE 2.

Referring now to FIG. 6, there is shown a flow chart representing the process of updating the allocation percentages which are shown in TABLE 2 and are parameters included in the customer's call processing logic stored in the NCP 120 of FIG. 1. The function of block 325 in FIG. 4 is described by the flow charts of FIGS. 6 and 7. FIG. 6 presents a method for filing information, representing one call in TABLE 1, into the traffic data summary stored in TABLE 2 of FIG. 5. The method of FIG. 6 commences START, at block 325 of the method of FIG. 4, collecting all of the customer's call data for one call attempt. In the first step 201 of the method of FIG. 6, the counter storing the total number of attempts is incremented.

Then a decision 202 is made whether or not the call was answered. If the call was answered, the call is assigned 204 to the associated geographical destination in TABLE 2. If the call was unanswered, the total number of unanswered calls counter in TABLE 2 is incremented 203. Then the call is assigned 204 to the geographic destination in TABLE 2. No matter which way the call is assigned to the geographic branch, the number of call attempts counter for the destination is incremented 205.

Once again a decision 206 is made whether or not the call is unanswered. If the call was answered, the method proceeds to a decision step 215. If the call was unanswered, the number of unanswered calls for the assigned destination is incremented 207. Once that counter is incremented, or it has been determined that the call was answered, the processor is prepared to check if further steps should be taken to recalculate the routing allocation percentages of TABLE 2 in accordance with FIG. 7 or to stop.

Figure 7:
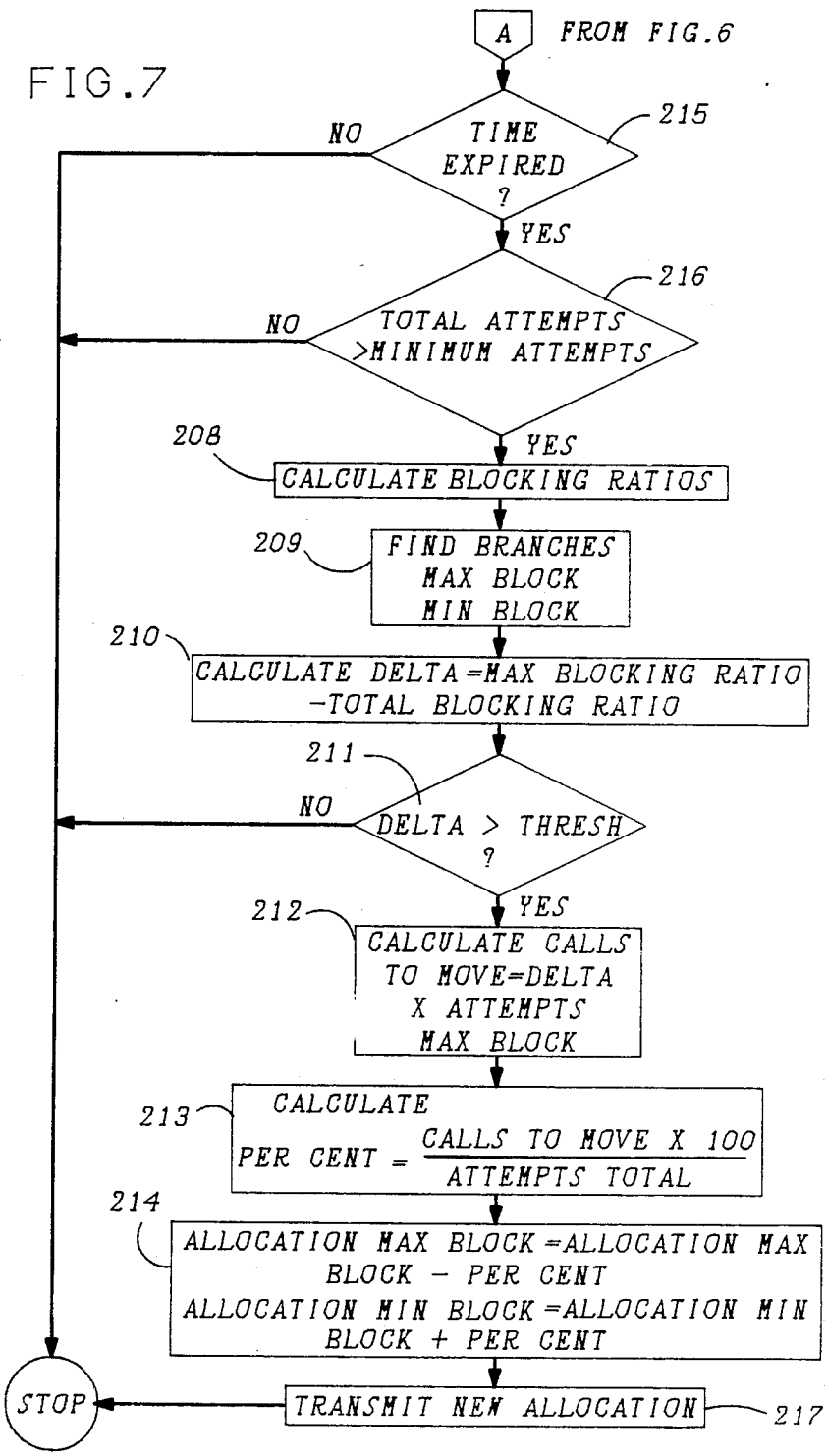
FIG. 7 is a flow chart of a method for updating the customer's traffic analysis data in TABLE 2 and for changing a parameter in the customer's call processing logic.

In the first check 215 of FIG. 7, a system timer, not shown is examined to determine if the duration of the current sampling period is greater than the predetermined sampling period. If not, then this process stops and returns to the message processing flow chart of FIG. 4. If the duration is longer, then the next step 216 checks that the total number of call attempts is greater than some minimum number of call attempts which is set by the customer to determine when enough call data has been collected to make a valid recalculation of the routing allocation percentages. Again, if this check fails, the process stops and returns to the flow chart of FIG. 4. If this check is successful, the system then proceeds to recalculate and update the routing allocating percentages.

In the first step of calculations 208, the blocking ratios are calculated for each destination and for the total number of calls for reservations. Then, the call data processor determines 209 which of the rows in TABLE 2, or destinations, has the maximum blocking ratio and which has the minimum blocking ratio. In TABLE 2 those rows are labeled in the right hand column, respectively MAX BLOCK and MIN BLOCK. Thereafter the call data processor calculates 210 a difference DELTA which is equal to the maximum blocking ratio minus the total blocking ratio. The difference DELTA is calculated by subtracting the total blocking ratio for the system from the blocking ratio of the row MAX BLOCK.

In the next subsequent step, the factor DELTA is compared 211 with a threshold value THRESH which is selected by the customer for determining when to adjust the allocation percentages and is stored in the call data processor. The threshold value THRESH is a number representing the minimum difference between the maximum blocking ratio and the total blocking ratio which will cause the allocation percentages to be changed. Thus if the value DELTA is not greater than the threshold value THRESH, the calculation stops. For example consider that THRESH is set at 0.02. When DELTA is less than 0.02, the decision block 211 causes the recalculation of the allocation percentages to stop. Thus the updating process is discontinued until the end of the next predetermined call sampling period.

On the other hand, if the value DELA exceeds the threshold value THRESH, the decision block 211 continues the updating process. The call data processor calculates 212 a number of calls to be moved from the maximum blocking ratio destination to the minimum blocking ratio destination. Thus a number of calls are to be redirected from the destination of the row designated MAX BLOCK to the destination of the row designated MIN BLOCK. The number of calls to be moved is equal to the value DELTA times the number of attempts made to the maximum blocking destination. The result of this calculation is the number of calls to be moved.

The next step is to calculate 213 the PERCENT of calls to be moved. This percent equals one hundred times the number of calls to be moved divided by the total number of call attempts made for reservations during the predetermined call sampling period.

Thereafter new, or updated, allocation percentages are calculated 214 for the destinations of the rows MAX BLOCK and MIN BLOCK. The new allocation percent for the maximum blocking ratio destination equals the original allocation percent for that destination minus the PERCENT of call attempts to be moved. The new allocation for the minimum blocking ratio destination equals the original allocation percent for that destination plus the PERCENT of call attempts to be moved.

This ends the calculations for the predetermined call sampling period. An actual number of calls to be redirected is determined indirectly from the new or updated, values for the allocation percentages.

As the last step 217 in this process, once these new, or updated, allocations are calculated by the call data processor 145 of FIG. 1 and are stored therein, they are also transmitted by way of a data link 162 to the NCP 120 where the customer record of FIG. 5 is overwritten with the new, or updated, allocation percentages. Since these call allocation percentages are parameters used in the customer's call processing logic their new, or updated, values automatically distribute calls differently than before. This change of call distribution occurs in real time and will reduce total blocking for subsequent calls to the customer's equipment and attendants.

The entire summary of traffic analysis data of TABLE 2 is sent by way of line 143, USS 140, and line 139 for display on the customer's terminal 141.

These new, or updated, allocation percentages are to be used for subsequent call processing decisions. As subsequent calls for reservations are received, those calls will be distributed to the Atlanta, the Chicago and the Los Angeles locations in accordance with the new allocation percentages.

Once the original allocation percentages are overwritten by the updated percentages, the call data processor erases the call data for the sampling period and can commence collecting new call data in TABLE 1 for another plurality of calls occurring during a subsequent call sampling period.

The foregoing describes a process for dynamically allocating the call load among several destinations in a toll-free telephone calling service having unique call handling capabilities for diverse customers. The appended claims are understood to define the arrangements and the methods described herein and other call load allocating arrangements and processes made obvious in view thereof.

What is claimed is:

1. A telecommunication network arranged for a calling station to dial a customer's number to reach any one of a plurality of the customer's answering stations in the network, the network being arranged for communicating signaling messages through a common channel signaling circuit between the calling station and a network control point to set up a call from the calling station to one of the customer's answering stations selected by the customer call processing logic stored within the network, at least part of the customer's answering stations being arranged to distribute calls to a plurality of attendants, the network comprising means for reading the signaling messages communicated through the common channel signaling circuit to collect the customer's call data from plural calls to the customer's number;

means interconnected with the reading means for storing the customer's call data from the plural calls to the customer's number; and means interconnected with the storing means for processing the customer's call data collected from the plural calls to produce a traffic data summary for the plural calls to the customer's number.

2. A telecommunication network, in accordance with claim 1, further comprising means for transmitting the traffic data summary from the processing means for immediate delivery to the customer.

3. A telecommunication network in accordance with claim 1, wherein the processing means further comprise means, responsive to the traffic data summary and a predetermined threshold value, for revising at least one parameter included in the customer's call processing logic into a changed parameter value, and means for transmitting the changed parameter value to the network control point and overwriting that parameter in the customer's call processing logic stored within the network control point.

4. A telecommunication network arranged for a calling station to dial a customer's number to reach any one of a plurality of the customer's answering stations in the network, the network being arranged for communicating signaling messages through a common channel signaling circuit between the calling station and a network control point to set up a call from the calling station to one of the customer's answering stations selected by the customer's call processing logic stored within the network, at least part of the customer's answering stations being arranged to distribute calls to a plurality of attendants, the network comprising means for reading the signaling messages communicated through the common channel signaling circuit to collect the customer's call data from plural calls to the customer's number;

means interconnected with the reading means for storing the customer's call data as call attempt records for the plural calls to the customer's number; and means interconnected with the storing means for transmitting the call attempt records for immediate delivery to the customer.

5. A method for compiling traffic analysis data from a telecommunication network with plural customers, each customer having a calling service using individually customized call processing data, call attempt records, and a summary of traffic analysis data, the method comprising the steps of collecting call data from a signaling circuit that is common to calls to the plurality of customers;

transmitting the collected call data to a call data processor;

identifying the collected call data to a specific customer;

storing the specific customer's collected call data in the customer's call attempt records; and transmitting the specific customer's call attempt records relating to a plurality of calls to the specific customer.

6. A method for compiling traffic analysis data from a telecommunication network with plural customers, each customer having a calling service using individually customized call processing data, call attempt records, and a summary of traffic analysis data, the method comprising the steps of collecting call data from a signaling circuit that is common to calls to the plurality of customers;

transmitting the collected call data to a call data processor;

identifying the collected call data to a specific customer;

storing the specific customer's collected call data in the customer's call attempt records;

processing the call attempt records into the summary of traffic analysis data for the plurality of calls to the specific customer; and transmitting the specific customer's summary of traffic analysis data to the specific customer.

7. A method for changing call processing logic in a telecommunication network that provides a received call distribution service for a customer, the method comprising the steps of transmitting to and storing in a network control point and in a call data processor call processing logic including a parameter customized specifically for the customer's service and used by the network for processing calls to the customer;

collecting call data, representing a plurality of calls to the customer, the call data being collected from a signaling circuit that is common to calls to a plurality of customers;

transmitting the collected call data to the call data processor;

identifying and storing the collected call data in call attempt records identified with the customer;

processing the customer's call attempt records to produce a summary of traffic analysis data for the plurality of calls to the customer;

processing the summary of traffic analysis data with a predetermined threshold for determining whether or not to change the parameter;

if the parameter is to be changed, determining a changed parameter value; and overwriting the parameter value with the changed parameter value in both the call data processor and the network control point.

8. A method for reducing call blocking in a telecommunication network that provides a received call distribution service for a customer, the method comprising the steps of transmitting to and storing in a network control point and in a call data processor call processing logic including a parameter customized specifically for reducing the number of blocked call attempts to the customer and used by the network for processing calls to the customer;

collecting call data, representing a plurality of calls to the customer, the call data being collected from a signaling circuit that is common to calls to a plurality of customers;

transmitting the collected call data to the call data processor;

identifying and storing the collected call data in call attempt records identified with the customer;

processing the customer's call attempt records to produce a summary of traffic analysis data for the plurality of calls to the customer;

processing the summary of the traffic analysis data with a predetermined threshold for determining whether or not the change the parameter;

if the parameter is to be changed, determining a changed parameter value that reduces call blocking for calls made subsequently in the network; and overwriting the parameter value with the changed parameter value in both the call data processor and the network control point.

9. The method for reducing call blocking, in accordance with claim 8, wherein call attempts, subsequent to determining the changed parameter, are processed through the network to the customer by way of the call processing logic including the changed parameter which reduces blocking of call attempts with respect to blocking of call attempts caused by the original parameter value.

* * * * *

UNITED STATES PATENT AND TRADEMARK OFFICE
CERTIFICATE OF CORRECTION

PATENT NO. : 4,788,718

DATED : Nov. 29, 1988

INVENTOR(S) : Sandra D. McNabb and Richard S. Yien

It is certified that error appears in the above-identified patent and that said Letters Patent is hereby corrected as shown below:

In the Specification
```
    col.2, line 59,  "ACP"  should read --action point--;
           line 63,  "STP"  should read --signaling transfer point--;
           line 66,  "STP"  should read --signaling transfer point--; and
           line 66,  "NCP"  should read --network control point--.
    col.3, line 3,   "ACPs" should read --action points--;
           line 8,   "NCP"  should read --network control point--;
           line 12,  "NCP"  should read --Network control point--;
           line 14,  "NCP"  should read --network control point--;
           line 15,  "NCP"  should read --network control point--;
           line 18,  "NCP"  should read --network control point--;
           line 19,  "DSDC" should read --direct services dialing capability--;
           line 19,  "ACP"  should read --action point--;
           line 22,  "and"  should read --or--;
           line 25,  "NCP"  should read --network control point--;
           line 35,  "NCP"  should read --network control point--;
           line 37,  "NCP"  should read --network control point--;
           line 41,  "USS"  should read --User support system--;
           line 43,  "NCP"  should read --network control point--;
           line 46,  "DSDC" should read --direct services dialing capability--;
           line 49,  "NCP"  should read --network control point--;
           line 50,  "DSDC" should read --direct services dialing capability--;
           line 52,  "NCP"  should read --network control point--;
           line 55,  "ACP"  should read --action point--;
           line 61,  "DSDC" should read --direct services dialing capability--;
           line 61,  "DSDC" should read --Direct services dialing capability--;
           line 64,  "NCP"  should read --network control point--;
           line 66,  "ACP"  should read --action point--; and
           line 68,  "ACP"  should read --action point--.
    col.4, line 2,   "ACPs" should read --action points-- ;
           line 2,   "STP"  should read --signaling transfer point--;
           line 2,   "NCP"  should read --network control point--;
```

UNITED STATES PATENT AND TRADEMARK OFFICE
CERTIFICATE OF CORRECTION

PATENT NO. : 4,788,718                                 Page 2 of 4

DATED : Nov. 29, 1988

INVENTOR(S) : Sandra D. McNabb and Richard S. Yien

It is certified that error appears in the above-identified patent and that said Letters Patent is hereby corrected as shown below:

```
line  5, "NCP"  should read --network control point--;
line  9, "ACP"  should read --action point--;
line  9, "NSC"  should read --network services complex--;
line 10, "DSDC" should read --direct services dialing capability--;
line 12, "ACP"  should read --Action point--;
line 13, "NSC"  should read --network services complex--;
line 16, "NSC"  should read --Network services complex--;
line 18, "NSC"  should read --network services complex--;
line 23, "ACP"  should read --action point--;
line 29, "NCP"  should read --network control point--;
line 31, "NCP"  should read --network control point--;
line 33, "DSDC" should read --direct services dialing capability--;
line 34, "ACP", all three occurrences, should read --action point--;
line 36, "ACP"  should read --action point--;
line 37, "ACP"  should read --Action point--;
line 37, "NCP"  should read --network control point--;
line 39, "DSDC" should read --direct services dialing capability--;
line 40, "ACP"  should read --action point--;
line 40, "DSDC" should read --direct services dialing capability--;
line 41, "DSDC" should read --direct services dialing capability--;
line 43, "ACP"  should read --action point--;
line 44, "NCP"  should read --network control point--;
line 46, "DSDC" should read --direct services dialing capability--;
line 46, "ACP"  should read --action point--;
line 50, "ACP"  should read --action point--;
line 56, "ACP"  should read --action point--;
line 57, "NCP"  should read --network control point--;
line 58, "ACP"  should read --action point--;
line 61, "NCP"  should read --network control point--;
line 61, "ACP"  should read --action point--;
line 63, "ACP"  should read --action point--;
line 64, "NCP"  should read --network control point--;
```

UNITED STATES PATENT AND TRADEMARK OFFICE
CERTIFICATE OF CORRECTION

PATENT NO. : 4,788,718                           Page 3 of 4

DATED     : Nov. 29, 1988

INVENTOR(S) : Sandra D. McNabb and Richard S. Yien

It is certified that error appears in the above-identified patent and that said Letters Patent is hereby corrected as shown below:

```
         line 65,  "ACP" should read --action point--;
         line 66,  "ACP" should read --action point--;and
         line 67,  "NCP" should read --network control point--.
col.5,   line 1,   "NCP" should read --network control point--;
         line 1,   "ACP" should read --action point--;
         line 2,   "ACP" should read --action point--;
         line 4,   "ACP" should read --action point--;
         line 5,   "NCP" should read --network control point--;
         line 6,   "DSDC" should read--direct services dialing capability--;
         line 9,   "NCP" should read--network control point--;
         line 11,  "ACP", both occurrences, should read --action point--;
         line 13,  "ACP" should read --action point--;
         line 14,  "NCP" should read --network control point--;
         line 43,  before "from" insert --(referring to FIG. 1)--;
         line 44,  "USS" should read --user support system--;
         line 44,  "NCP" should read --network control point--;
         line 45,  "NCP" should read --network control point--;
         line 49,  "NCP" should read --network control point--;
         line 49,  after "120" insert --in FIG. 1--;
         line 52,  "NCP" should read --network control point--;
         line 53,  "ACP" should read --action point--;
         line 54,  after "180" insert --(FIG. 2)--;
         line 55,  "ACP" should read --action point--;
         line 55,  after "110" insert --(FIG. 1)--;
         line 56,  "ACP" should read --action point--;
         line 57,  after "prompts" insert --(FIG. 2)--;
         line 67,  "NCP" should read --network control point--;and
         line 67,  "ACP" should read --action point--.
col.6,   line 2,   after "originating" insert --numbering plan area--;
         line 10,  "records" should read --record--;
         line 22,  "ACP" should read --action point--;
         line 22,  "STP" should read --signaling transfer point--;
         line 23,  "NCP" should read --network control point--;
```

UNITED STATES PATENT AND TRADEMARK OFFICE
CERTIFICATE OF CORRECTION

PATENT NO. : 4,788,718

DATED : Nov. 29, 1988

INVENTOR(S) : Sandra D. McNabb and Richard S. Yien

It is certified that error appears in the above-identified patent and that said Letters Patent is hereby corrected as shown below:

```
        line 24, "ACP" should read --action point--;
        line 25, "ACP" should read --action point--;
        line 28, "ACP" should read --action point--;
        line 29, "NSC" should read --network services complex--;
        line 31, "ACP" should read --action point--;
        line 32, "STP" should read --signaling transfer point--;
        line 32, "NCP" should read --network control point--;
        line 34, "ACP" should read --action point--;
        line 40, "ACP" should read --action point--;
        line 41, "NCP" should read --netword control point--;
        line 51, "ACP" should read --action point--;
        line 52, "NCP" should read --network control point--;and
        line 55, "ACP" should read --action point--.
col.7,  line 5,  "NPA" should read --area code--;
        line 39, "STP" should read --signaling transfer point--;and
        line 39, "NCP" should read --network control point--.
```

In the Claims
    Claim 1
    col. 11, line 49, "customer" should read --customer's--.

Signed and Sealed this

Third Day of October, 1989

Attest:

DONALD J. QUIGG

Attesting Officer

Commissioner of Patents and Trademarks